United States Patent
Heliot et al.

(10) Patent No.: US 9,846,256 B2
(45) Date of Patent: Dec. 19, 2017

(54) INTERACTIVE DISPLAY OF RESULTS OBTAINED FROM THE INVERSION OF LOGGING DATA

(75) Inventors: Denis Heliot, Sugar Land, TX (US); Nicholas N. Bennett, Sugar Land, TX (US); Georgi Kutiev, Houston, TX (US); Emmanuel Legandre, Sevres (FR); Roger Griffiths, Schaffhausen (CH); Jean-Michel Denichou, Beijing (CN); Jean Seydoux, Rio de Janeiro (BR); Qiming Li, Sugar Land, TX (US); Koji Ito, Sugar Land, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 969 days.

(21) Appl. No.: 13/205,869

(22) Filed: Aug. 9, 2011

(65) Prior Publication Data

US 2013/0038463 A1    Feb. 14, 2013

(51) Int. Cl.
*G01V 3/00* (2006.01)
*G01V 3/38* (2006.01)
*G01V 3/18* (2006.01)

(52) U.S. Cl.
CPC . *G01V 3/38* (2013.01); *G01V 3/18* (2013.01)

(58) Field of Classification Search
CPC ........................................................ G01V 3/18

(Continued)

(56) References Cited

U.S. PATENT DOCUMENTS

| 4,899,112 A | 2/1990 | Clark et al. |
| 6,826,486 B1 | 11/2004 | Malinvero |

(Continued)

FOREIGN PATENT DOCUMENTS

| EP | 1151326 A1 | 11/2001 |
| WO | 2009099825 A1 | 8/2009 |

OTHER PUBLICATIONS

Lloyd, S.P., Least squares quantization in PCM, IEEE Transactions on Information Theory, vol. 28(2), 1982, pp. 129-137.

(Continued)

*Primary Examiner* — Amine Benlagsir

(57) ABSTRACT

An interactive display of results obtained from the inversion of logging data is produced by obtaining and inverting the logging data using a Monte-Carlo inversion. An interactive plot having a percentile scale plotted against a location parameter is produced and a particular percentile is selected using the interactive plot. A cross-section plot for the particular percentile using the results of the Monte-Carlo inversion is produced. The particular percentile can be a curve representing a best-fit solution or a polyline representing selected solutions. Background color/shading can be displayed on the interactive plot to indicate user-defined constraints have been applied. Uncertain features can be plotted on a corresponding cross-section display using fading. Clusters of solutions that are substantially equally likely, given the measurements at a particular drill location, can be identified and plotted. A cross-section constructed from the layered models belonging to a particular cluster can be overlaid on another cross-section.

20 Claims, 11 Drawing Sheets

(58) Field of Classification Search
USPC .................. 324/338; 382/224, 131; 455/562; 702/10, 11, 23, 6, 7; 434/11; 703/14; 715/781; 600/561
See application file for complete search history.

(56) References Cited

U.S. PATENT DOCUMENTS

| | | | |
|---|---|---|---|
| 6,945,781 B2* | 9/2005 | Perry et al. ..................... 434/11 |
| 7,379,601 B2* | 5/2008 | Yang et al. .................... 382/224 |
| 7,949,476 B2* | 5/2011 | Strubel et al. .................. 702/23 |
| 8,331,671 B2* | 12/2012 | Dai .............................. 382/176 |
| 8,583,378 B2* | 11/2013 | Jacques et al. ................. 702/11 |
| 2002/0133323 A1* | 9/2002 | Dahlberg ................. G01V 3/38 703/10 |
| 2002/0169006 A1* | 11/2002 | Buehrer et al. ............... 455/562 |
| 2003/0214286 A1 | 11/2003 | Heidler |
| 2007/0168133 A1* | 7/2007 | Bennett et al. .................. 702/6 |
| 2007/0244646 A1* | 10/2007 | Zhang ..................... G01V 3/28 702/6 |
| 2008/0109204 A1* | 5/2008 | Zhang et al. .................. 703/14 |
| 2009/0198447 A1 | 8/2009 | Legendre et al. |
| 2010/0010744 A1* | 1/2010 | Prange et al. .................... 702/7 |
| 2010/0058222 A1* | 3/2010 | Bergstrom ............. G06T 19/00 715/782 |
| 2010/0095235 A1* | 4/2010 | Bennett et al. ............... 715/781 |
| 2010/0161228 A1* | 6/2010 | Heliot et al. .................... 702/10 |
| 2011/0264420 A1* | 10/2011 | Sander et al. .................... 703/2 |

OTHER PUBLICATIONS

International Search Report and Written Opinion issued corresponding International No. PCT/US2012/049891 dated Nov. 9, 2012; 8 pages.
Supplementary Search Report issued in EP application 12821824.5 dated Sep. 15, 2015, 3 pages.

* cited by examiner

INTERACTIVE DISPLAY OF RESULTS OBTAINED FROM THE INVERSION OF LOGGING DATA

CROSS-REFERENCE TO OTHER APPLICATIONS

N/A

BACKGROUND

Technical Field

This disclosure relates generally to well logging, and more particularly to the interactive display of results obtained from the inversion of the logging data.

Background Art

Logging tools have long been used in wellbores to make, for example, formation evaluation measurements to infer properties of the formations surrounding the borehole and the fluids in the formations. Common logging tools include electromagnetic tools, nuclear tools, and nuclear magnetic resonance (NMR) tools, though various other tool types are also used.

Early logging tools were run into a wellbore on a wireline cable, after the wellbore had been drilled. Modern versions of such wireline tools are still used extensively. However, the need for information while drilling the borehole gave rise to measurement-while-drilling (MWD) tools and logging-while-drilling (LWD) tools. By collecting and processing such information during the drilling process, the driller can modify or correct key steps of the operation to optimize performance.

MWD tools typically provide drilling parameter information such as weight on the bit, torque, temperature, pressure, direction, and inclination. LWD tools typically provide formation evaluation measurements such as resistivity, porosity, and NMR distributions. MWD and LWD tools often have components common to wireline tools (e.g., transmitting and receiving antennas), but MWD and LWD tools must be constructed to not only endure but to operate in the harsh environment of drilling. The terms MWD and LWD are often used interchangeably, and the use of either term in this disclosure will be understood to include both the collection of formation and wellbore information, as well as data on movement and placement of the drilling assembly.

SUMMARY

An interactive display of results obtained from the inversion of logging data is produced by obtaining and inverting the logging data using a Monte-Carlo inversion. An interactive plot having a percentile scale plotted against a location parameter is produced and a particular percentile is selected using the interactive plot. A cross-section plot for the particular percentile using the results of the Monte-Carlo inversion is produced. The particular percentile can be a curve representing a best-fit solution or a polyline representing selected solutions. Background color/shading can be displayed on the interactive plot to indicate user-defined constraints have been applied. Uncertain features can be plotted on a corresponding cross-section display using fading. Clusters of solutions that are substantially equally likely, given the measurements at a particular drill location, can be identified and plotted. A cross-section constructed from the layered models belonging to a particular cluster can be overlaid on another cross-section.

Other advantages and features will be apparent from the following detailed description when read in conjunction with the attached drawings.

It should be understood that the drawings are not to scale and that the disclosed embodiments are sometimes illustrated diagrammatically and in partial views. In certain instances, details that are not necessary for an understanding of the disclosed method and apparatus or that would render other details difficult to perceive may have been omitted. It should be understood that this disclosure is not limited to the particular embodiments illustrated herein.

DETAILED DESCRIPTION

Some embodiments will now be described with reference to the figures. Like elements in the various figures may be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship, as appropriate.

Figure 1:
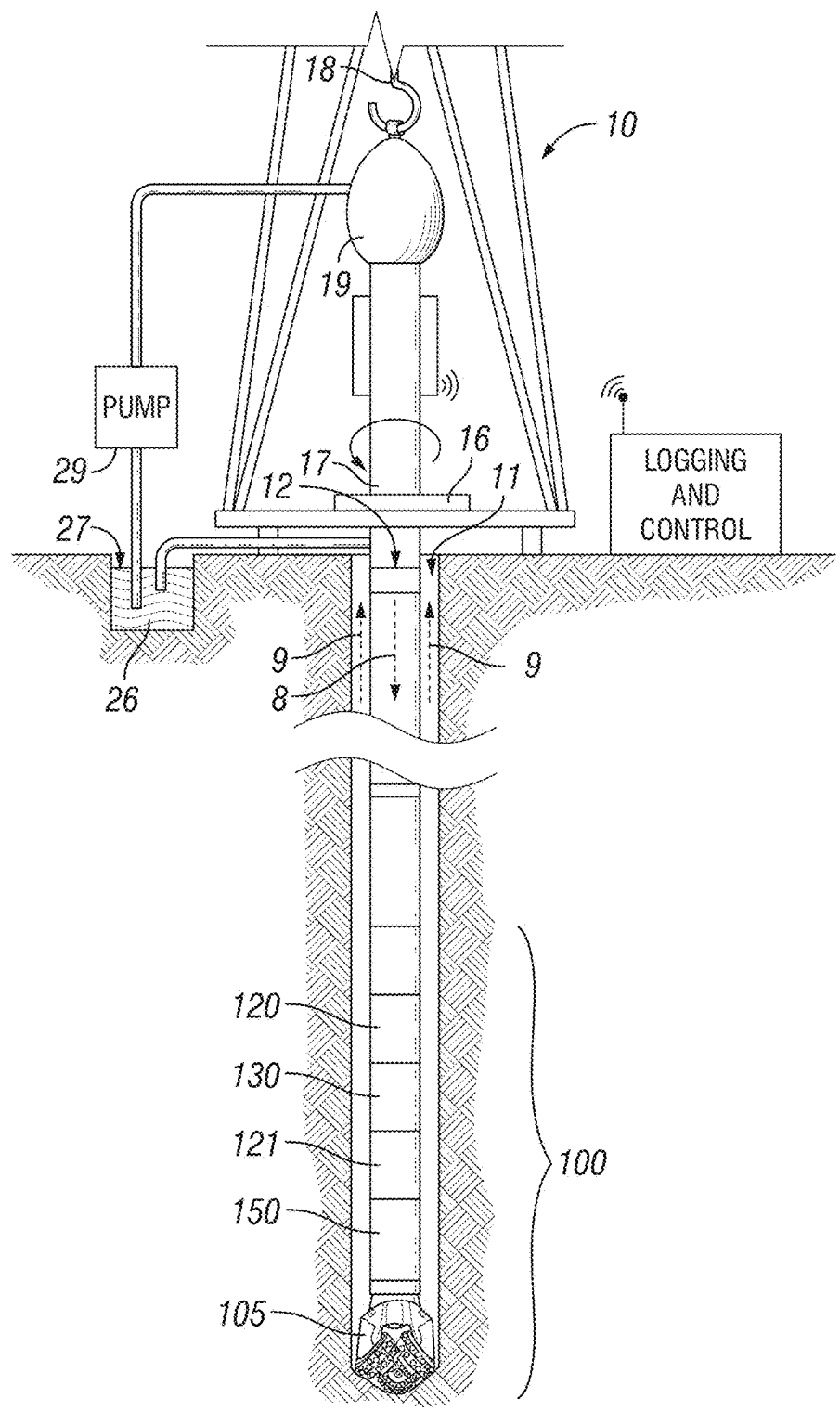
FIG. 1 illustrates an exemplary well site system.

FIG. 1 illustrates a well site system in which various embodiments can be employed. The well site can be onshore or offshore. In this exemplary system, a borehole 11 is formed in subsurface formations by rotary drilling in a manner that is well known. Some embodiments can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment includes a logging-while-drilling (LWD) module 120, a measuring-while-drilling (MWD) module 130, a roto-steerable system and motor 150, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a resistivity measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick/slip measuring device, a direction measuring device, and an inclination measuring device.

Figure 2:
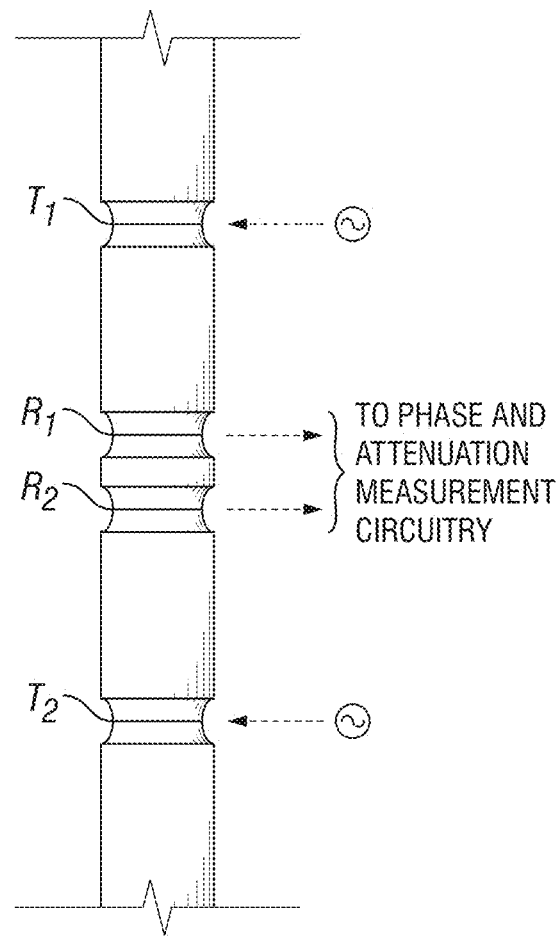
FIG. 2 shows a prior art electromagnetic logging tool.

An example of a tool which can be the LWD tool 120, or can be a part of an LWD tool suite 120A, is shown in FIG. 2. As seen in FIG. 2, upper and lower transmitting antennas, $T_1$ and $T_2$, have upper and lower receiving antennas, $R_1$ and $R_2$, therebetween. The antennas are formed in recesses in a modified drill collar and mounted in MC or insulating material. The phase shift of electromagnetic energy as between the receivers provides an indication of formation resistivity at a relatively shallow depth of investigation, and the attenuation of electromagnetic energy as between the receivers provides an indication of formation resistivity at a relatively deep depth of investigation. U.S. Pat. No. 4,899,112 can be referred to for further details. In operation, attenuation-representative signals and phase-representative signals are coupled to a processor, an output of which is coupleable to a telemetry circuit.

Recent electromagnetic (EM) logging tools use one or more tilted or transverse antennas, with or without axial antennas. Those antennas may be transmitters or receivers. A tilted antenna is one whose dipole moment is neither parallel nor perpendicular to the longitudinal axis of the tool. A transverse antenna is one whose dipole moment is perpendicular to the longitudinal axis of the tool, and an axial antenna is one whose dipole moment is parallel to the longitudinal axis of the tool. A triaxial antenna is one in which three antennas (i.e., antenna coils) are arranged to be mutually orthogonal. Typically, one antenna (coil) is axial and the other two are transverse. Two antennas are said to have equal angles if their dipole moment vectors intersect the tool's longitudinal axis at the same angle. For example, two tilted antennas have the same tilt angle if their dipole moment vectors, having their tails conceptually fixed to a point on the tool's longitudinal axis, lie on the surface of a right circular cone centered on the tool's longitudinal axis and having its vertex at that reference point. Transverse antennas obviously have equal angles of 90 degrees, and that is true regardless of their azimuthal orientations relative to the tool.

Figure 3:
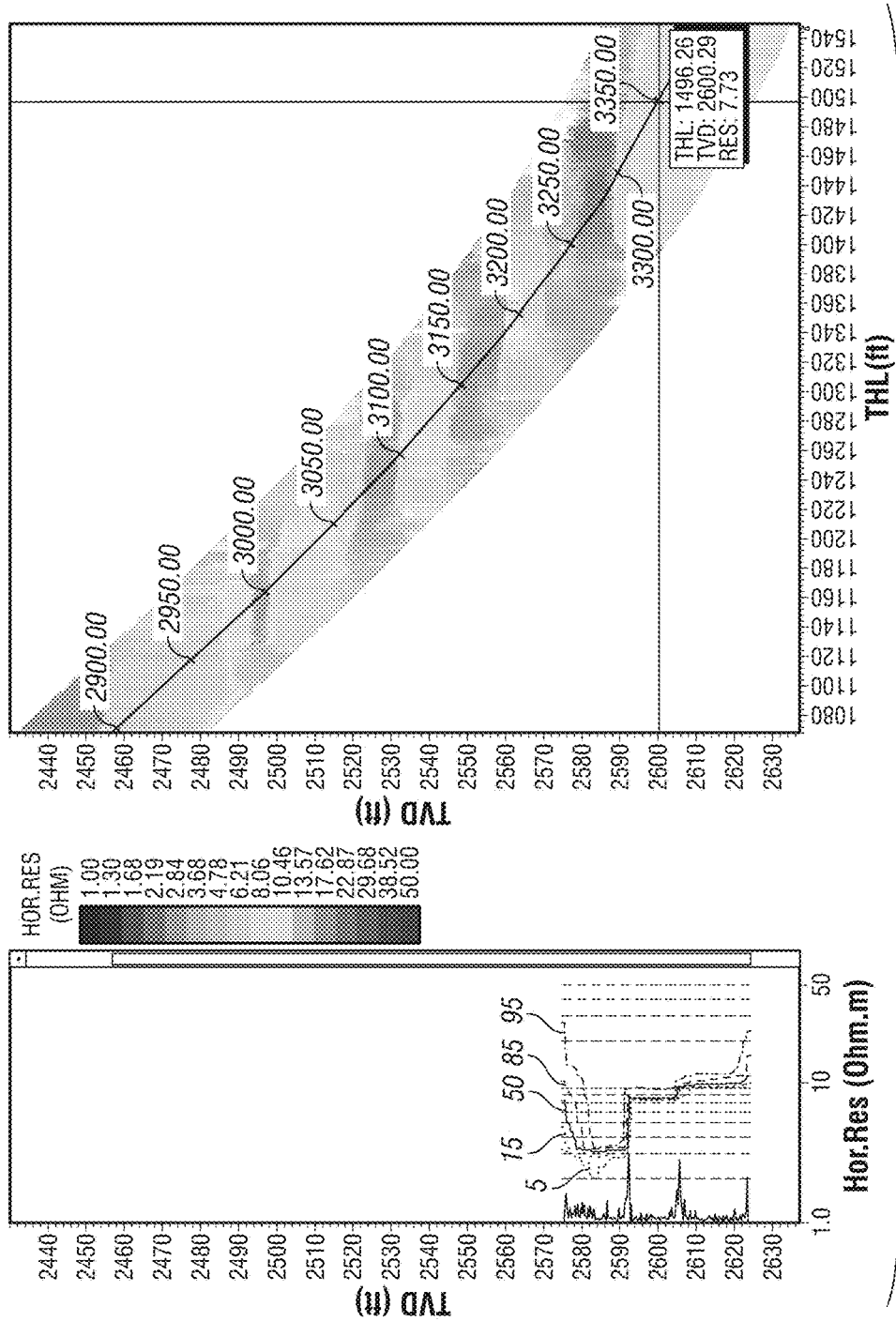
FIG. 3 shows a prior art cross-section display of a 50% quintile formation model generated by a Monte-Carlo inversion.

FIG. 3 shows a prior art cross-section display of a 50% quintile formation model generated by a Monte-Carlo inversion. The Y-axis of the cross section is typically TVD (True Vertical Depth), and the X-axis is typically THL (True Horizontal Length) in a highly deviated well. The X-axis may instead represent a series of tool positions in the case of a vertical or near-vertical well. Alternatively, the cross-section display may be a "best" solution, based on some optimization scheme. The a posteriori distribution of layered models is displayed as a set of curves alongside (i.e., to the left of) the cross-section.

Figure 4:
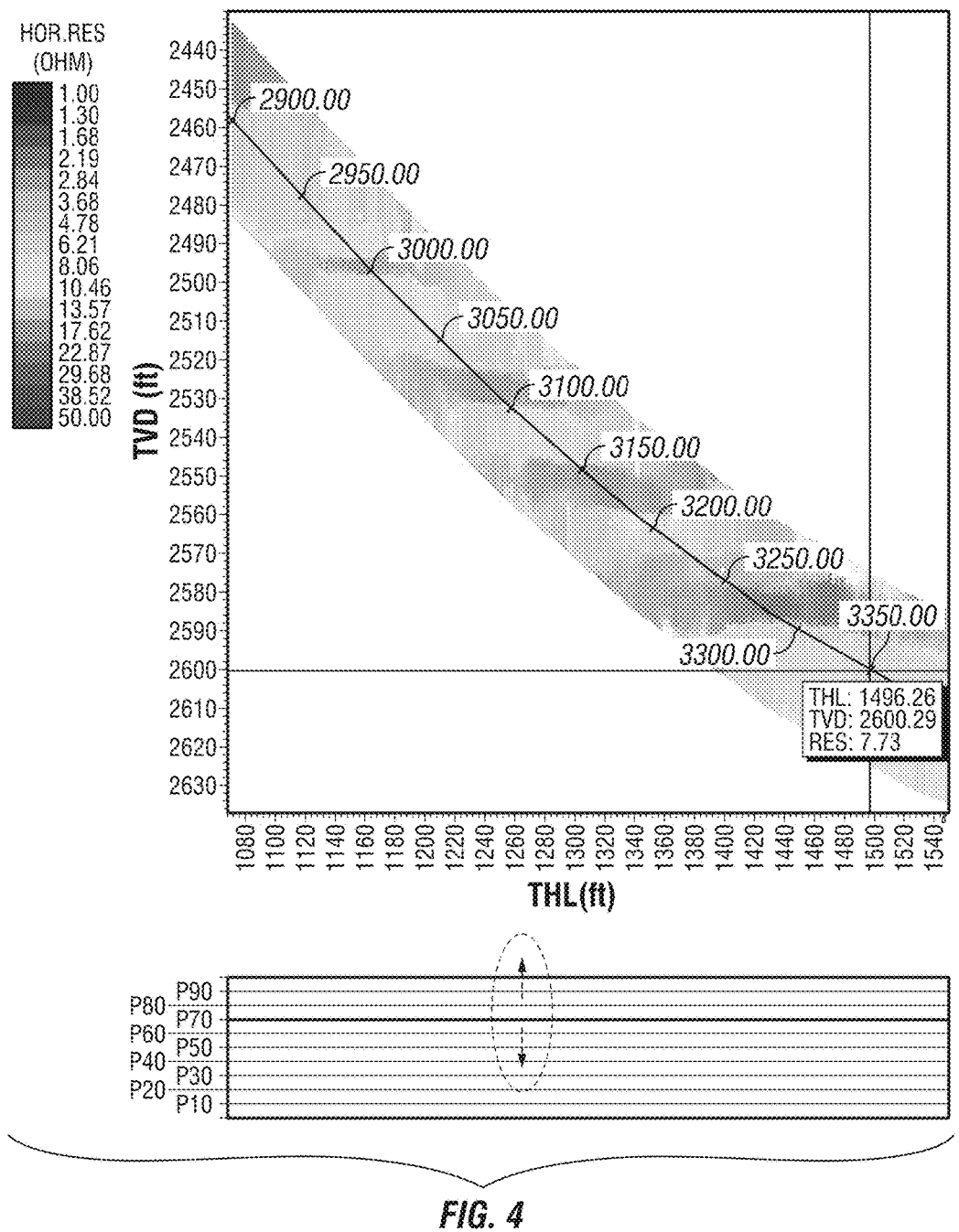
FIG. 4 shows a cross-section display of a selected percentile formation model, but one in which an interactive display is placed beneath the X-axis of the cross-section plot, in accordance with the present disclosure.

FIG. 4 shows a similar plot, but one in which an interactive display is placed beneath the X-axis of the cross-section plot. A well placement engineer can use such an interactive graphic presentation to more fully exploit the Monte-Carlo inversion results and thereby make geosteering and/or geo-stopping decisions while drilling a well. The X-axis of this plot typically represents displacement along the trajectory of a highly-deviated well. It may also represent, for example in a low angle well, a function of displacement, a succession of measurement stations, or a function of a succession of measurement stations. Those parameters are collectively referred to herein as location parameters. The Y-axis is a percentile scale representing the a posteriori probability distribution function (PDF) generated by the Monte-Carlo inversion.

The interactive display is used to control how the results of the Monte-Carlo inversion are used to make the cross-section display. For example, a user can move a horizontal percentile line, using what is referred to herein as the "interactor", to control which results of the Monte-Carlo inversion are used to build the cross-section. Moving the horizontal line from, say, y=50% to y=90% will change the cross-section from representing the median value from an inversion to the 90th percentile results from that inversion for all x values. This may allow the user to better gauge the sensitivity of the results (e.g., the uncertainty in the parameters describing the layered formation). Optionally, when the user changes the percentile in the interactive plot, a corresponding curve representing resistivity profile can move synchronously in the vertical resistivity profile plot (top left in FIG. 3). This resistivity profile corresponds to a particular position on the x-axis, typically selected by the user. This provides the user an additional feel for the uncertainty variance versus the depth at a given X-axis position.

Figure 5:
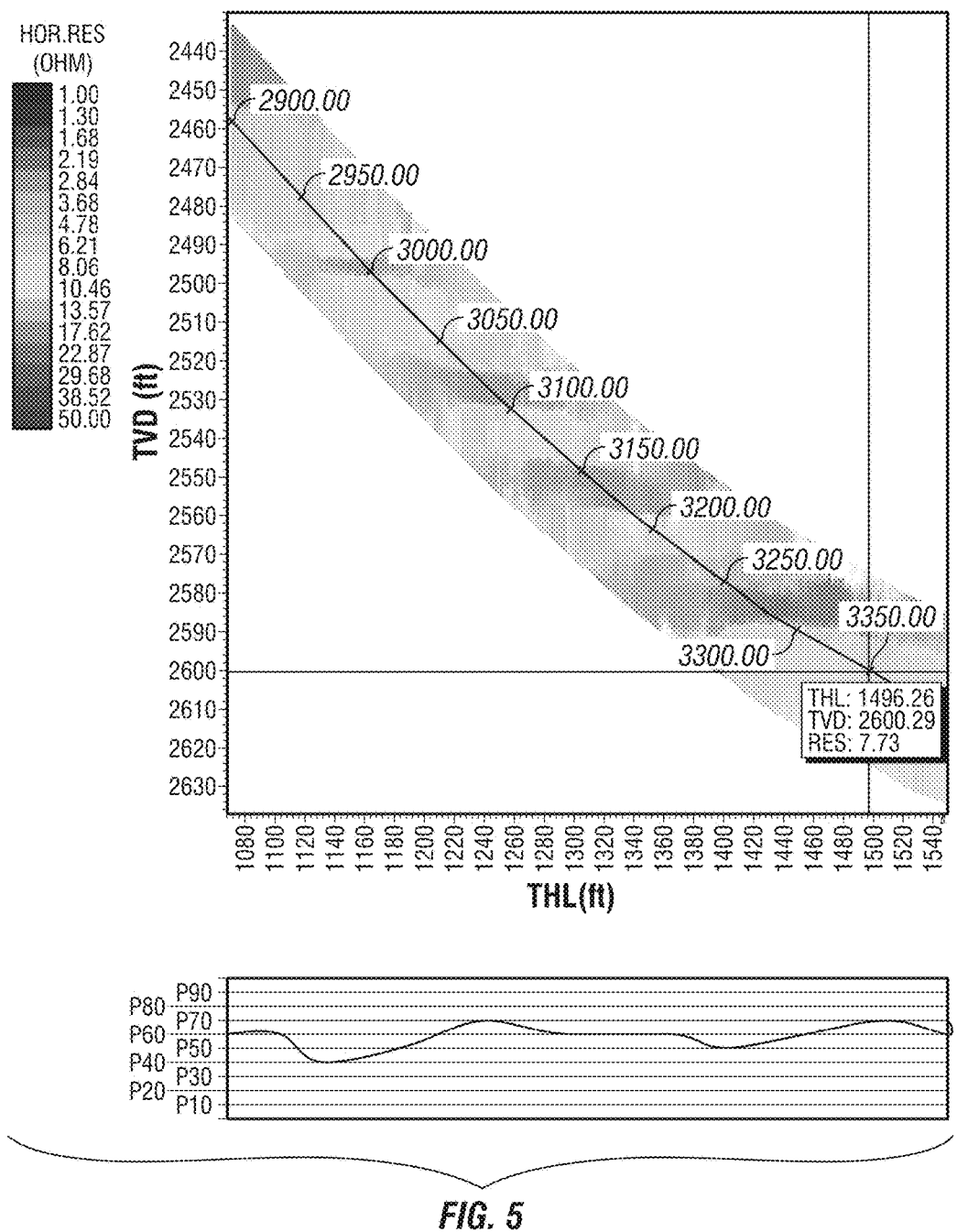
FIG. 5 shows a plot of the curve representing the "best solution" from an error minimization point of view drawn on the interactive plot. This curve can be selected to generate a cross-section showing the best-fit solution for all x values, in accordance with the present disclosure.

A curve representing the "best solution" from an error minimization point of view can be drawn on the interactive plot. This curve can be selected to generate a cross-section showing the best-fit solution for all x values. FIG. 5 shows such a plot.

Figure 6:
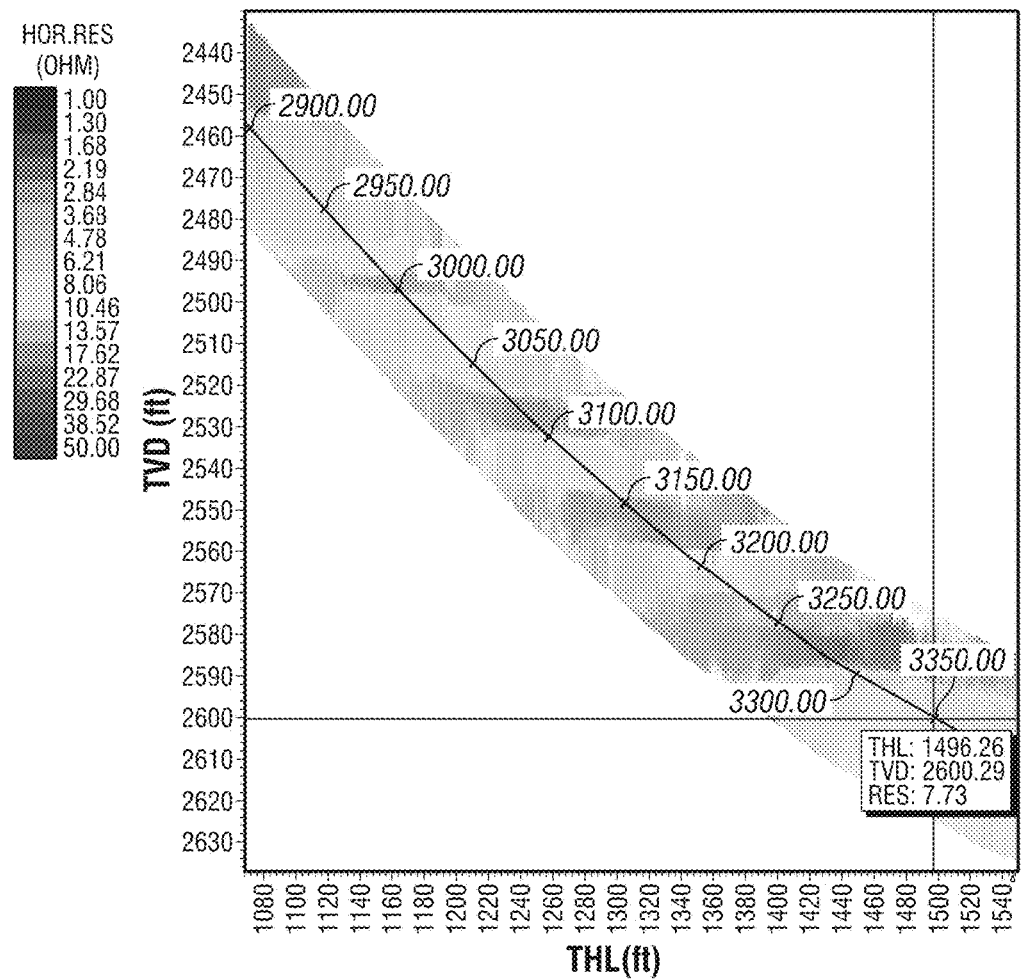
FIG. 6 shows a plot of a series of points entered by a user to drive the creation of a polyline y=f(x) and to define a cross-section with selected results, in accordance with the present disclosure.
Figure 6:
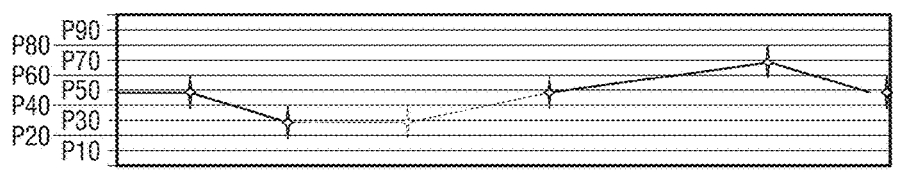

In another mode of interaction, a series of points can be entered by the user (see FIG. 6) to drive the creation of a polyline y=f(x) and to define a cross-section with selected results. Several curves can be displayed simultaneously on the interactive plot, each corresponding to a different selection of Monte-Carlo inversion results. In one interaction mode, the user can select among those curves to move from one cross-section display to another.

Different methods are available to generate one or several curves in the interactive display, each corresponding to a selection of Monte-Carlo inversion results from which the user can select. At least two classes can be distinguished among those methods. A first class exploits the outputs of the standard Monte-Carlo inversion. One technique from this class decomposes the a posteriori distribution of the Monte-Carlo inversion into the sum of a series of n Gaussian distributions and creates n curves corresponding to the mean of each of those Gaussian distributions.

A second class introduces additional criteria to select a sub-population of the a posteriori distribution of the standard Monte-Carlo inversion. This second class is a direct extension of the Monte-Carlo inversion, where the criteria for a result to be kept not only include the distance between the measured data curves and the curves obtained by a forward modeling of the inversion result, but also include additional conditions such as only those models: having resistivities in a given range at a given distance from the tool, having a given number of beds, belonging to the main cluster of models, yielding local anisotropy in a given range, and having the highest correlation with solutions found at a selected X position. An exemplary set of such criteria could be articulated as "results with a local resistivity anisotropy greater than five in layers of less than two ohm-m resistivity". One could then compute for each station the best-fit result that satisfies those criteria, thereby defining a curve in the interactive plot and the corresponding cross-section.

Using those criteria to post-process the standard Monte-Carlo inversion rather than embedding them in a cost function educes a clear separation between "impartial" data analysis and "user-driven" logic, and allows for the flexibility for a user to define local criteria, such as those applicable only to a given field or well. For instance, shales will have anisotropy above five only in relatively old formations. Therefore, that criterion may make sense in one area, based on geology, but not in other areas. Those criteria could be established prior to drilling as part of the well plan, exploiting a priori knowledge.

Figure 7:
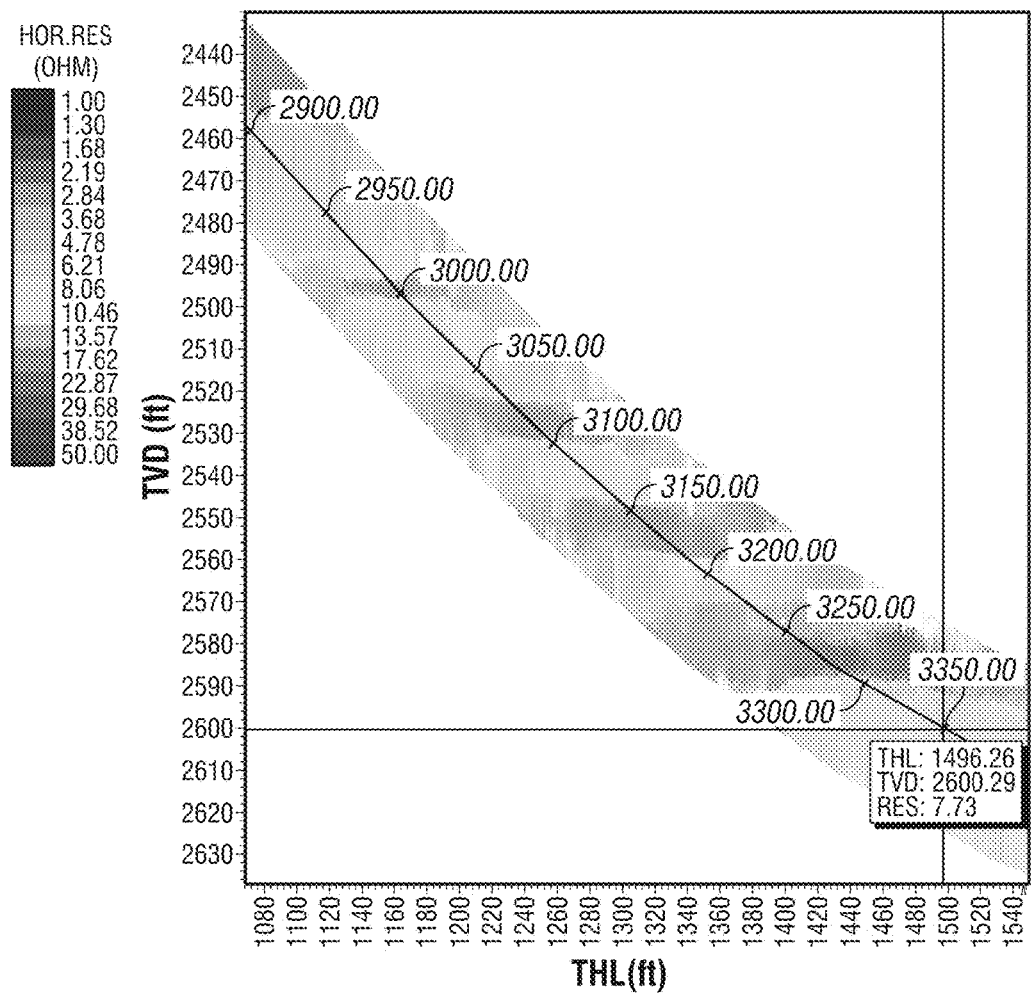
FIG. 7 shows a plot of in which constraints are changed within the inverted interval, the zones over which constraint sets are applied being indicated by the background color (shade) of the percentile display, in accordance with the present disclosure.
Figure 7:
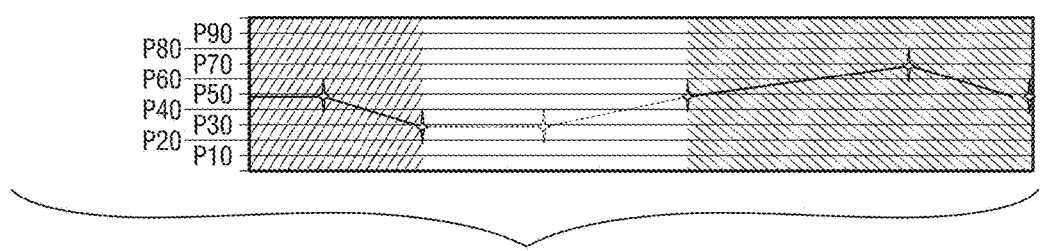

As a further display option, the background of the interactive plot can be colored or shaded as a function of the error, from a minimization point of view, corresponding to the Monte-Carlo inversion result at a particular x station and y percentile. Where constraints are changed within the inverted interval, the zones over which constraint sets are applied is indicated by the background color (shade) of the percentile display, as shown in FIG. 7. No background color (or white background) indicates that the "impartial" Monte-Carlo result is being displayed.

A further example makes use of a clustering algorithm to provide for an automatic separation of the set of layered models comprising the a posterior distribution into a set of informative clusters. Such a technique is helpful by providing the user with alternate scenarios that are equally probable given the constraints of the measurements. Some of those scenarios may be consistent with the user's prior knowledge of the field or particular well. The user can then select a specific scenario with which to update the curtain plot (cross-section) display.

Figure 8:
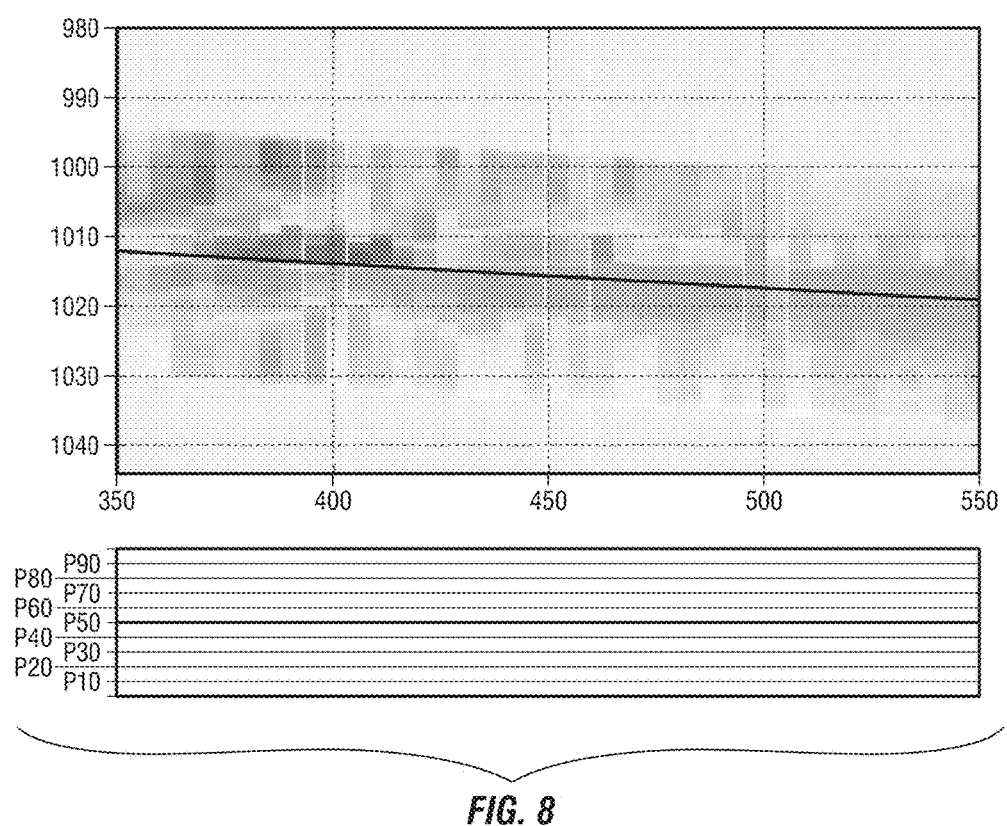
FIG. 8 shows a canvas plot (cross-section) with a resistive layer below the tool that is considered to be an uncertain feature, in accordance with the present disclosure.
Figure 9C:
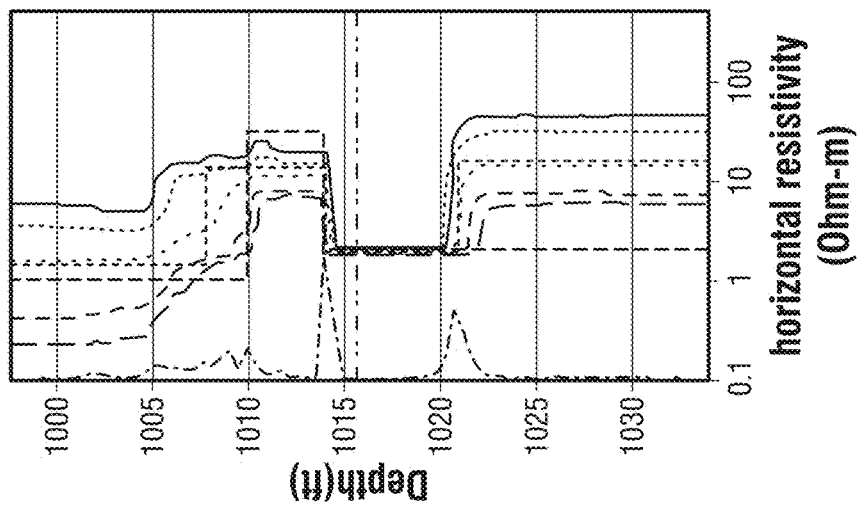
FIG. 9C shows the subset of solutions designated cluster 2, in accordance with the present disclosure.
Figure 9B:
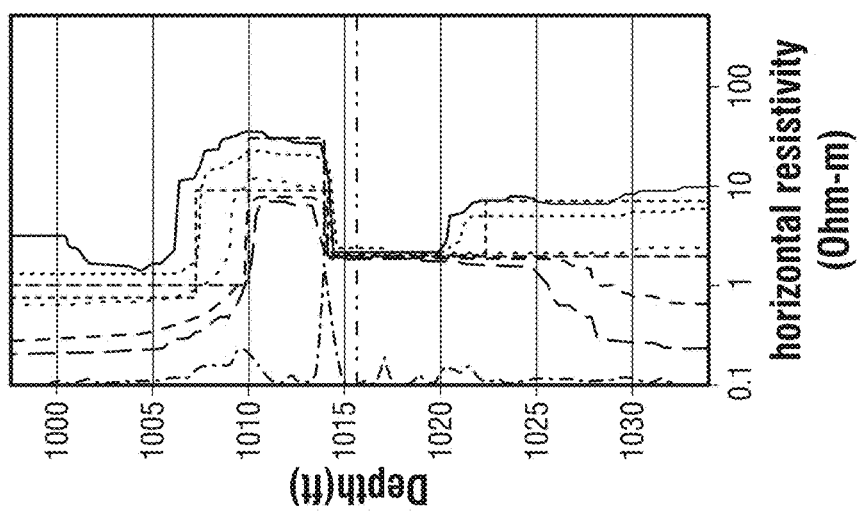
FIG. 9B shows the subset of solutions designated cluster 1, in accordance with the present disclosure.
Figure 9A:
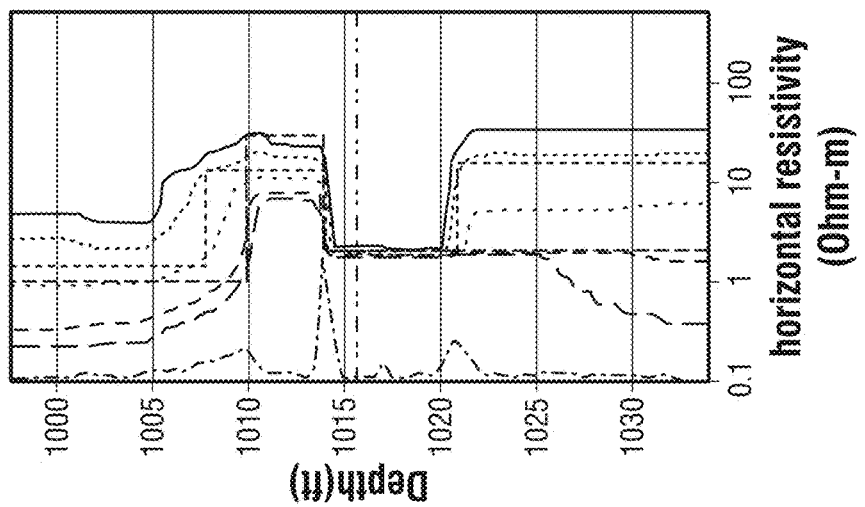
FIG. 9A shows the layered model histograms for the measurement station indicated by the arrow in the cross-section of FIG. 8, in accordance with the present disclosure.

For example, FIG. 8 shows a canvas plot (cross-section) with a resistive layer below the tool that is considered to be an uncertain feature. The canvas plot shows the 50th percentile solution, with fading. The resistive layer feature below the tool, located below 1020 feet TVD, is an uncertain feature, as the faded out display indicates. Here, the user has selected the measurement station highlighted by the arrow in the canvas plot of FIG. 8. The corresponding layered model histogram pictured in FIG. 9A shows the uncertain resistive feature, as indicated by the arrow in the plot. In this case, the user has requested an automatic clustering of the set of solutions into two clusters.

The process of clustering the set of layered models into two clusters can be accomplished as follows. Suppose that the layered models are indexed by j=1, . . . , N. Let I be the true vertical depth interval in which the layered models are defined. In the case shown in FIG. 8, the TVD interval is I=[997, 1033] feet. The interval I is divided into a set of M=50 equal length subintervals, $I_i$, i=1, . . . , M. A matrix D, whose entry $D_{ij}$ is the average horizontal resistivity of the $j^{th}$ layered model in the $i^{th}$ subinterval $I_i$, is prepared. Then, a k-means clustering algorithm to divide the collection of columns of the matrix D (that contain the discretized profiles of resistivity for each layered model) into the user-selected number of clusters, K, is applied. For this case, the number of clusters K equals two. The k-means clustering algorithm returns an index set Λ that indicates the cluster to which each layered model $λ_j$ belongs ($λ_i ∈ \{1, . . . , K\}$). The clustering algorithm also returns K cluster centroids $μ_i$ for I=1, . . . K, which are vectors of length M that define the average resistivity profiles for the layered models belonging to each cluster.

Figure 10:
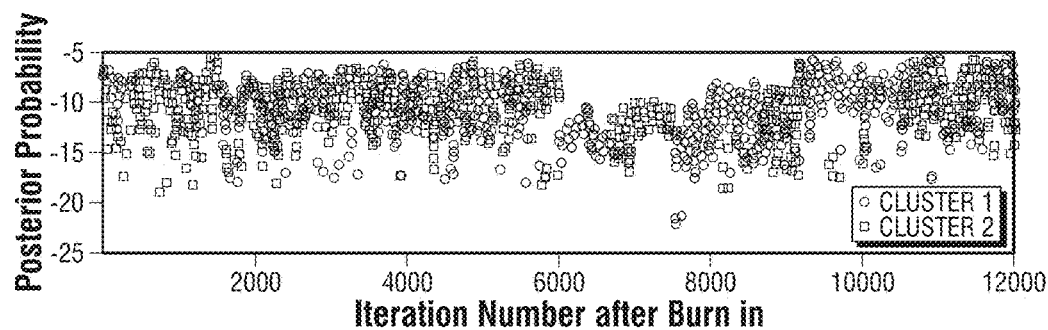
FIG. 10 shows the two clusters of solutions from FIGS. 9B and 9C are otherwise equally likely given the measurements at the current drill location, in accordance with the present disclosure.

FIG. 9A shows the layered model histograms for the measurement station indicated by the arrow in the cross-section of FIG. 8. FIG. 9B shows the subset of solutions designated cluster 1, and FIG. 9C shows the subset of solutions designated cluster 2. As stated above, the arrow in FIG. 9A indicates the location of the uncertain resistive feature shown below the tool in FIG. 8. It can be seen from the plots that the median of resistivity in the region above 1010 feet TVD for cluster 1 is more conductive than the median resistivity for cluster 2. Having drilled through the zone above 1010 feet TVD, and knowing the zone is indeed more conductive, the user can select cluster 1 as being more consistent with the local knowledge of the well. In addition, it can be seen that the two clusters of solutions are otherwise equally likely given the measurements at the current drill location, as shown in FIG. 10. FIG. 10 shows the a posteriori probability of layered models belonging to clusters 1 and 2 from FIG. 9. The graph shows that the two clusters of solutions are largely indistinguishable given the constraints of the measurements.

Figure 12:
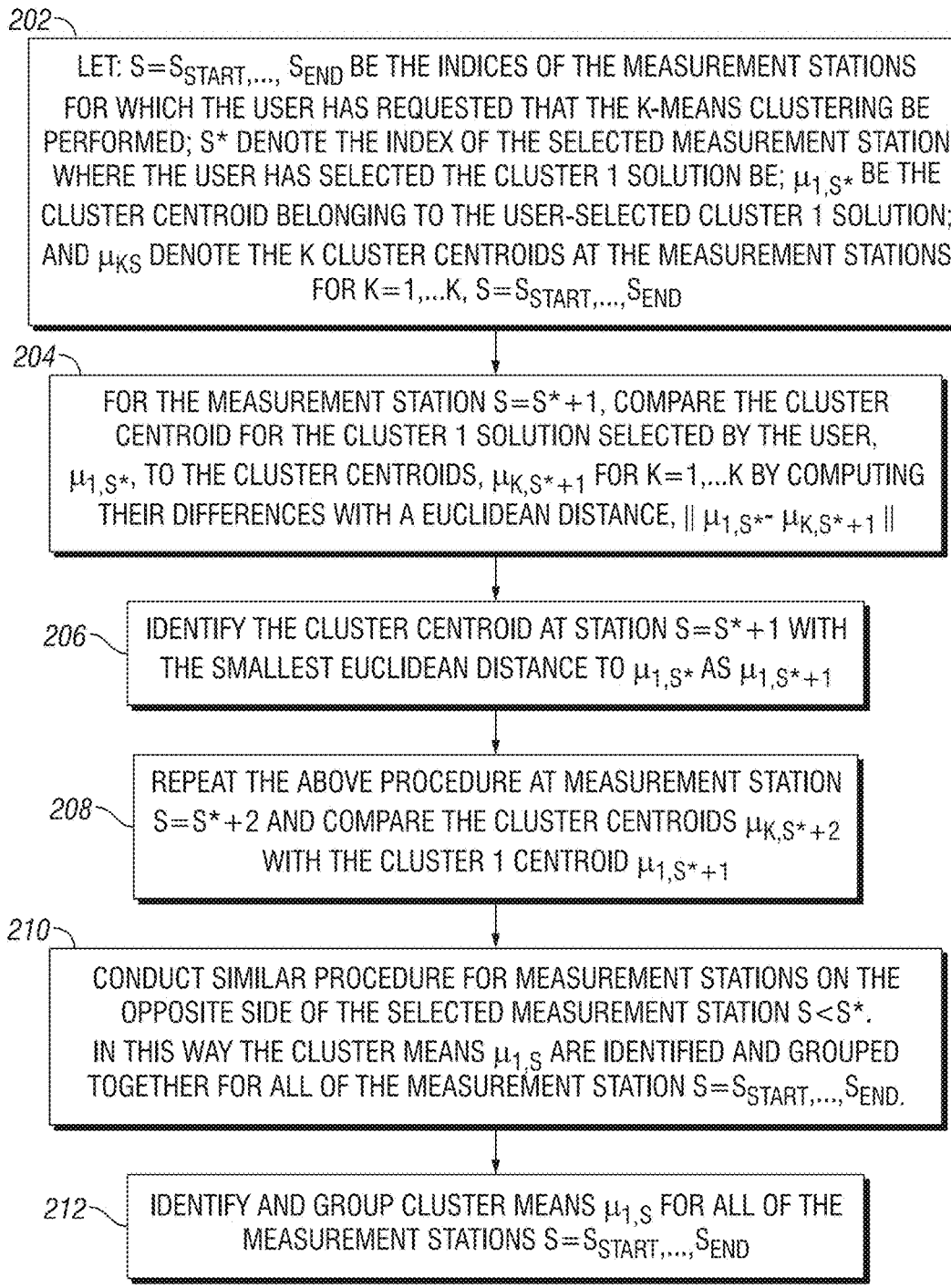
FIG. 12 shows a flowchart of exemplary steps for an embodiment, in accordance with the present disclosure.

An automatic k-means clustering can be performed at the measurement stations near the selected measurement station, and a new curtain plot can be constructed which displays the cluster 1 solutions in the selected region. This processing step can be accomplished as follows and shown in FIG. 12. Let $s=s_{start}, \ldots, s_{end}$ be the indices of the measurement stations for which the user has requested that the k-means clustering be performed. Let the index of the selected measurement station where the user has selected the cluster 1 solution be denoted $s^*$ and the cluster centroid belonging to the user-selected cluster 1 solution be $\mu_{1,s^*}$. Let the K cluster centroids at the measurement stations be denoted $\mu_{k,s}$ for $k=1, \ldots K$, $s=s_{start}, \ldots, s_{end}$ (step 202). For the measurement station $s=s^*+1$, we compare (step 204) the cluster centroid for the cluster 1 solution selected by the user, $\mu_{1,s^*}$, to the cluster centroids, $\mu_{k,s^*+1}$ for $k=1, \ldots K$ by computing their differences with a Euclidean distance, $\|\mu_{1,s^*}-\mu_{k,s^*+1}\|$. The cluster centroid at station $s=s^*+1$ with the smallest Euclidean distance to $\mu_{1,s^*}$ is identified/labeled (after possibly reordering the clusters and their centroids) $\mu_{1,s^*+1}$ (step 206).

Figure 11:
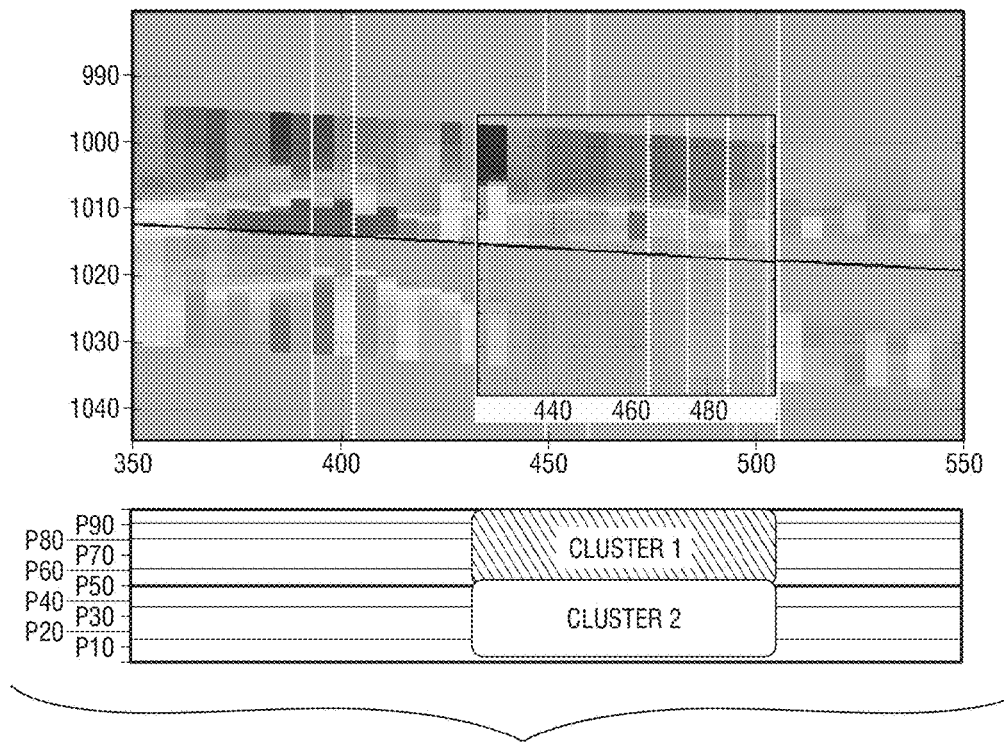
FIG. 11 is a curtain plot display showing the 50th percentile solution without the fading, as well as the cluster 1 solutions selected using the automatic clustering procedure and user prior knowledge, in accordance with the present disclosure.

This same procedure is then repeated (step 208) at measurement station $s=s^*+2$ where we again compare the cluster centroids $\mu_{k,s^*+2}$ with the cluster 1 centroid $\mu_{1,s^*+1}$. An entirely similar procedure is conducted (step 210) for the measurement stations to the left of the selected measurement station $s<s^*$. In this way the cluster means $\mu_{1,s}$ are identified and grouped together (step 212) for all of the measurement stations $s=s_{start}, \ldots, s_{end}$. As shown in FIG. 11, a curtain plot section constructed from the layered models belonging to the cluster 1 solutions can be overlaid on top of the curtain plot from FIG. 8, so the user can inspect the effect of selecting the cluster 1 solutions for this portion of the well. FIG. 11 is an updated curtain plot display showing the 50th percentile solution without the fading, as well as the cluster 1 solutions selected using the automatic clustering procedure and user prior knowledge. Thus, the user can partition the Monte Carlo inversion results into clusters of solutions, inspect which cluster is most consistent with the user's knowledge of the field or well, and update the curtain plot section to reflect the user's solution cluster selection.

While only certain embodiments have been set forth, alternatives and modifications will be apparent from the above description to those skilled in the art. These and other alternatives are considered equivalents and within the scope of this disclosure and the appended claims.

What is claimed is:

1. A method to produce an interactive display of a plurality of model solutions obtained from a Monte Carlo inversion of electromagnetic logging data, the method comprising:
   (a) rotating an electromagnetic logging while drilling tool in a subterranean wellbore, the logging while drilling tool including at least one transmitting antenna and at least one receiving antenna deployed about a drill collar;
   (b) causing the electromagnetic logging tool to obtain the electromagnetic logging data while said rotating in (a), the electromagnetic logging data including a phase shift and an attenuation of electromagnetic energy transmitted between the transmitting antenna and the receiving antenna;
   (c) inverting the electromagnetic logging data obtained in (b) using a the Monte Carlo inversion to obtain the plurality of model solutions;
   (d) producing an interactive plot that includes a cross-section plot of one of the plurality of model solutions obtained from the Monte Carlo inversion in (c), the interactive plot further having a percentile scale plotted against a location parameter;
   (e) adjusting a position and shape of a percentile marker on the interactive plot, said adjusting operative to select a second one of the plurality of model solutions for a particular percentile indicated by the percentile marker; and
   (f) reproducing the interactive plot including the cross-section plot of the second one of the plurality of model solutions selected in (e);
   (g) estimating subsurface formation properties of the subterranean wellbore from the electromagnetic logging data using the cross-section plot of the second one of the plurality of model solutions selected in (e) obtained from the inversion of the electromagnetic logging data that includes the phase and the attenuation of the electromagnetic energy using the Monte Carlo inversion.

2. The method of claim 1, wherein the percentile marker is a curve representing a best-fit solution or a polyline representing selected solutions.

3. The method of claim 1, further comprising displaying one or more background colors/shadings on the interactive plot to indicate user-defined constraints have been applied.

4. The method of claim 1, further comprising plotting uncertain features on the cross-section plot using fading.

5. The method of claim 1, further comprising:
   (g) evaluating the plurality of model solutions using a clustering algorithm;
   (h) binning the plurality of model solutions into at least two distinct clusters; and
   (i) constructing histograms of each of the distinct clusters.

6. The method of claim 5, further comprising:
   (j) overlaying a cross-section plot constructed from layered models belonging to a particular cluster on another cross-section plot.

7. The method of claim 1, wherein the location parameter includes one of displacement, a function of displacement, a succession of measurement stations, or a function of a succession of measurement stations.

8. The method of claim 1, wherein said adjusting the position and the shape of the percentile marker comprises using an interactor on the interactive plot.

9. The method of claim 1, further comprising using the cross-section plot to estimate formation properties.

10. The method of claim 1, further comprising post-processing inversion results from the Monte Carlo inversion using a priori knowledge.

11. The method of claim 1, further comprising decomposing a posteriori distribution of the inversion of the electromagnetic logging data into a sum of Gaussian distributions and creating curves corresponding to a mean of each of those Gaussian distributions.

12. A system to estimate subterranean formation properties from electromagnetic logging data, comprising:

a logging and control system located on or near the earth's surface;

an electromagnetic logging while drilling tool deployed in a subterranean wellbore, the electromagnetic logging while drilling tool including at least one transmitting antenna and at least one receiving antenna deployed about a drill collar, the electromagnetic logging while drilling tool configured to obtain the electromagnetic logging data while rotating in the subterranean wellbore, the electromagnetic logging data including a phase shift and an attenuation of electromagnetic energy transmitted between the transmitting antenna and the receiving antenna;

the logging and control system comprising a processor configured to: (i) invert the electromagnetic logging data using a Monte Carlo inversion to obtain a plurality of model solutions; (ii) produce an interactive plot that includes a cross-section plot of one of the plurality of model solutions obtained from the Monte Carlo inversion, the interactive plot further having a percentile scale plotted against a location parameter; (iii) accepting user-input and adjusting a position and shape of a percentile marker on the interactive plot, said adjusting operative to select a second one of the plurality of model solutions for a particular percentile indicated by the percentile marker; (iv) reproducing the interactive plot including the cross-section plot of the second one of the plurality of model solutions selected in (iii); (v) and estimating the subterranean formation properties using the cross-section plot of the second one of the plurality of model solutions selected in (iii) obtained from the inversion of the electromagnetic logging data that includes the phase and the attenuation of the electromagnetic energy using the Monte Carlo inversion.

13. The system of claim 12, wherein the processor is integral to the logging and control system or is remote from, but in communication with, the logging and control system.

14. The system of claim 12, wherein the electromagnetic logging while drilling tool obtains the electromagnetic logging data at various stations within the subterranean wellbore.

15. A method to estimate subsurface formation properties from electromagnetic logging data, comprising:
(a) rotating an electromagnetic logging while drilling tool in a subterranean wellbore, the electromagnetic logging while drilling tool including at least one transmitting antenna and at least one receiving antenna deployed about a drill collar;

(b) causing the electromagnetic logging while drilling tool to obtain the electromagnetic logging data while said rotating in (a), the electromagnetic logging data including a phase shift and an attenuation of electromagnetic energy transmitted between the transmitting antenna and the receiving antenna;

(c) inverting the electromagnetic logging data obtained in (b) using a Monte Carlo inversion to obtain a plurality of model solutions;

(d) producing an interactive plot that includes a cross-section plot of one of the plurality of model solutions obtained from the Monte Carlo inversion, the interactive plot further having a percentile scale plotted against a location parameter;

(e) accepting user-input and adjusting a position and shape of a percentile marker on the interactive plot in response to the user-input, said adjusting operative to select a second one of the plurality of model solutions for a particular percentile indicated by the percentile marker;

(f) reproducing the interactive plot including the cross-section plot of the one of the plurality of model solutions selected in (d); and (g) estimating the subsurface formation properties using the cross-section plot of the second one of the plurality of model solutions selected in (e) obtained from the inversion of the electromagnetic logging data that includes the phase and the attenuation of the electromagnetic energy using the Monte Carlo inversion.

16. The method of claim 15, wherein the subsurface formation properties include resistivity.

17. The method of claim 15, wherein the user-input is provided using an interactor on the interactive plot.

18. The method of claim 15, further comprising post-processing inversion results from the Monte Carlo inversion using a priori knowledge.

19. The method of claim 15, further comprising:
(g) evaluating the plurality of model solutions using a clustering algorithm;
(h) binning the plurality of model solutions into at least two distinct clusters; and
(i) constructing histograms of each of the distinct clusters.

20. The method of claim 15, further comprising:
(j) overlaying a cross-section plot constructed from layered models belonging to a particular cluster on another cross-section plot.

* * * * *

UNITED STATES PATENT AND TRADEMARK OFFICE
CERTIFICATE OF CORRECTION

| | | |
|---|---|---|
| PATENT NO. | : 9,846,256 B2 | Page 1 of 1 |
| APPLICATION NO. | : 13/205869 | |
| DATED | : December 19, 2017 | |
| INVENTOR(S) | : Denis Heliot et al. | |

It is certified that error appears in the above-identified patent and that said Letters Patent is hereby corrected as shown below:

On the Title Page

Item (75) Replace "Emmanuel Legandre" with ---Emmanuel Legendre---

Signed and Sealed this
Fourteenth Day of March, 2023

*Katherine Kelly Vidal*
Katherine Kelly Vidal
*Director of the United States Patent and Trademark Office*